US007188261B1

(12) United States Patent
Tobias et al.

(10) Patent No.: US 7,188,261 B1
(45) Date of Patent: Mar. 6, 2007

(54) PROCESSOR OPERATIONAL RANGE INDICATOR

(75) Inventors: David F. Tobias, Pflugerville, TX (US); Morrie Altmejd, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 644 days.

(21) Appl. No.: 10/132,614

(22) Filed: Apr. 25, 2002

Related U.S. Application Data

(63) Continuation of application No. 09/876,291, filed on Jun. 7, 2001.

(60) Provisional application No. 60/287,897, filed on May 1, 2001.

(51) Int. Cl.
*G06F 1/26* (2006.01)

(52) U.S. Cl. .......................................... 713/300; 713/1

(58) Field of Classification Search ................ 713/1, 713/2, 100, 300, 322; 716/4
See application file for complete search history.

(56) References Cited

U.S. PATENT DOCUMENTS

| 5,103,166 | A |   | 4/1992 | Jeon et al. |
| 5,555,201 | A | * | 9/1996 | Dangelo et al. ................ 716/1 |
| 5,727,208 | A | * | 3/1998 | Brown ........................ 713/100 |
| 5,764,529 | A |   | 6/1998 | Capps, Jr. et al. |
| 5,812,860 | A | * | 9/1998 | Horden et al. .............. 713/322 |
| 5,998,853 | A |   | 12/1999 | Sugasawara |
| 6,519,698 | B1 | * | 2/2003 | Leyda et al. ................... 713/2 |
| 6,859,882 | B2 | * | 2/2005 | Fung ........................ 713/300 |

FOREIGN PATENT DOCUMENTS

WO       WO 97/12400         11/1997

OTHER PUBLICATIONS

Fortun Vladimir, Diamond Monster 3D FAQ, Apr. 28, 1997, pp. 1-13.*

* cited by examiner

*Primary Examiner*—Thomas C. Lee
*Assistant Examiner*—Mark Connolly
(74) *Attorney, Agent, or Firm*—Zagorin O'Brien Graham LLP

(57) ABSTRACT

An integrated circuit device provides an operational set point indicator. The operational set point indicator is utilized for obtaining a plurality of operational set points. Each of the plurality of operational set points can be a pair of an operational voltage and an operational frequency for application to the integrated circuit device. The operational set point indicator can be, for example, a Schmoo Class Register, a Device Identification Register, or actual operating condition information of the integrated circuit device. The Schmoo Class Register and the Device Identification Register are utilized to identify a performance state table in memory. The actual operating conditional information can be one or more entire Schmoo Plots for the device or a subset of such information. Operational set points are used during operation of the integrated circuit device, for example, in power management applications.

47 Claims, 7 Drawing Sheets

Prior Art

EXEMPLARY PERFORMANCE STATE TABLE (PST)

| TABLE IDENTIFICATION | VALUE |
|---|---|
| SET POINT 1 | 300 MHz 1.25 V |
| SET POINT 2 | 500 MHz, 1.30 V |
| SET POINT 3 | 600 MHz, 1.35 V |
| SET POINT 4 | 700 MHz, 1.40 V |
| SET POINT 5 | 800 MHz, 1.40 V |

FIG. 1

PROCESSOR OPERATIONAL RANGE INDICATOR

CROSS-REFERENCE TO RELATED APPLICATION(S)

This application is a continuation of patent application Ser. No. 09/876,291, filed Jun. 7, 2001 entitled "METHOD AND APPARATUS FOR IMPROVING RESPONSIVENESS OF A POWER MANAGEMENT SYSTEM IN A COMPUTING DEVICE," having David F. Tobias, Evandro Menezes, Richard Russell and Morrie Altmejd as inventors, which claims priority to a provisional application entitled "METHOD AND APPARATUS FOR POWER MANAGEMENT OF A COMPUTING SYSTEM" (U.S. Provisional Application No. 60/287,897), filed May 1, 2001, having Richard Russell, Evandro Menezes, Dave Tobias, Morrie Altmejd and Kyle Odiorne as inventors, both of which are incorporated herein by reference in their entirety for all purposes.

BACKGROUND

1. Field of the Invention

This invention relates to integrated circuit (IC) devices and more particularly to coupling to or including on the device an indicator of the device's operational range for use in the power management of systems utilizing the device.

2. Description of the Related Art

Power consumption and associated performance and thermal issues are considerations for every computer system design. For example, a conventional notebook computer (also commonly referred to as a laptop or portable computer) has power and thermal constraints that cause it to operate at performance states below an equivalent desktop computer. Additionally, as servers become larger and utilize more power, servers must manage heat dissipation.

Many power saving techniques have been introduced to alleviate the impact of thermal and battery power constraints in systems. The frequency of operation (clock frequency) and operating voltage of a processor in a computer system determines the power consumption of the processor. Because power consumption and therefore heat generation are roughly proportional to the processor's frequency of operation, scaling down the processor's frequency has been a common method of staying within appropriate power limitations. Processors utilized in mobile applications, i.e., those used in battery powered systems, are particularly sensitive to power considerations and therefore generally require the lowest supply voltage that can achieve the rated clock speed. That is in part due to the small, densely packed system construction that limits the ability of the mobile computer system to safely dissipate the heat generated by computer operation.

Appropriately monitoring and controlling the processor's operating parameters is important to optimizing performance and battery life and/or reducing thermal power dissipated. Power management techniques can utilize operating range information to vary a processor's voltage and frequency to achieve optimum results. For example, when switching a processor's operating frequency from a higher to a lower frequency, the voltage can also be switched to the lowest supply voltage that can achieve the lower frequency. Operating range information is typically supplied by the processor's manufacturer and included in BIOS for use by power management software.

During production of a processor, the manufacturer operates the processor at a matrix of voltages and frequencies to determine the operating range for which the processor operates properly. The result of this process is a "Schmoo Plot" (also referred to as a "Shmoo Plot") which is a graph of voltage and frequency of the operational range of the processor. There is typically a different Schmoo Plot for each process technology that a processor is implemented in, and additionally for each speed grade within that process technology. A Schmoo Plot can be converted into a performance state table (PST) containing a plurality of voltage/frequency pairs. Power management software can utilize these voltage/frequency pairs to control the voltage and frequency of the processor according to performance power states of the system. The PST can be stored, for example, in a computer system BIOS for use by a power management driver. An exemplary PST is shown in FIG. 1. A PST can include one or more Table Identification fields. The value of these fields can be a numerical value, a processor identification value or other such identifying value. A PST also includes a plurality of operational set points, for example, a set of voltage/frequency pairs within the operational range of the corresponding processor. Power management software can implement performance power states by assigning several of the set points to several performance power states. During each of the performance power states, voltage and frequency of the processor is applied according to the assigned set points.

The use of PSTs is problematic because the power management driver must be able to accurately identify the appropriate PST for a given processor. Because BIOS typically supports multiple processors, there is generally more than one PST in BIOS and the power management software has to match the appropriate table to the processor implemented in the system. The power management software typically reads the CPUID field, which includes the processor model, silicon revision and stepping number. However, the CPUID field is not an accurate indicator of which PST to use because the CPUID field typically only identifies the silicon design and not the process technology or speed grade. To determine the appropriate PST to use, the power management software must read other system related factors. For example, the software must read system information such as the front side bus (FSB) speed information and processor specific information such as start voltage and maximum frequency information. Processor specific information is typically added to the device after speed grade determination utilizing, for example, on-package laser cut elements. While the system provides the ability to read many of the laser cut elements and other registers that help to identify the processor, the information is located in many different registers, and typically in different register spaces, for example, in model specific registers (MSRs) and in I/O locations. To accurately identify a processor implemented in a system, software must read multiple locations to identify the appropriate PST to use in power management performance states.

In additional to the problem of properly identifying the processor to determine the appropriate PST to use, the addition of new processor features or new processor versions causes a need for a BIOS revision to update the PST entries or appropriate code. For example, when new features are added to a processor, the new MSRs that hold status bits for these new features are not interpreted by existing software. The processor can be improperly identified as another processor which can produce improper frequencies and voltages being applied to the processor. To take advantage of new process improvements, new entries must be added to the set of PSTs stored in BIOS. Revising BIOS code is typically a costly and undesirable solution due to cycle time, the need for verification, and an unwillingness of BIOS vendors to modify code.

It would be desirable to provide a better way to accurately identify the implemented processor and its operational range information for use by power management software.

SUMMARY

Accordingly, in one embodiment, an integrated circuit device provides an operational set point indicator. The operational set point indicator is utilized for obtaining a plurality of operational set points. Each of the plurality of operational set points can be a pair of an operational voltage and an operational frequency for application to the integrated circuit device. Operational set points are used during operation of the integrated circuit device, for example, in power management applications.

In one embodiment, the operational set point indicator is a Schmoo Class Register. The Schmoo Class Register is utilized to identify a performance state table in memory.

In still another embodiment, the operational set point indicator is a Device Identification Register. The Device Identification Register accurately indicates the capabilities of the integrated circuit device. Those capabilities are utilized to identify a performance state table in memory.

In still another embodiment, the operational set point indicator is actual operating condition information of the integrated circuit device. The actual operating conditional information can be one or more entire Schmoo Plots for the device or a subset of such information.

BRIEF DESCRIPTION OF THE DRAWINGS

The present invention may be better understood, and its numerous objects, features, and advantages made apparent to those skilled in the art by referencing the accompanying drawings.

FIG. 1 illustrates an exemplary performance state table (PST).

The use of the same reference symbols in different drawings indicates similar or identical items.

DESCRIPTION OF THE PREFERRED EMBODIMENT(S)

Figure 2:
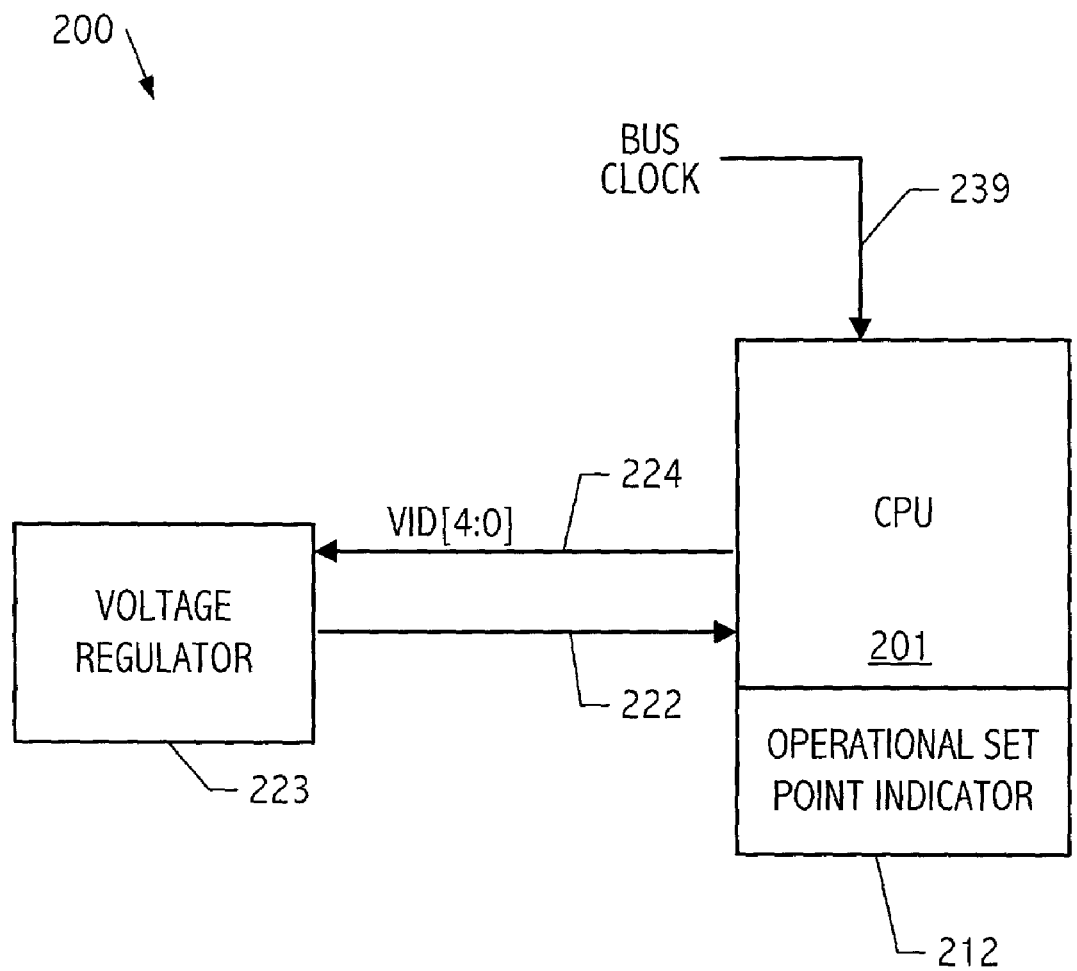
FIG. 2 illustrates a computer system utilized by an embodiment of the present invention.

FIG. 2 illustrates a computer system 200 utilized by an embodiment of the present invention. Computer system 200 has the ability to provide a plurality of processor performance states for use by power management software. The plurality of processor performance states are generally based on unique voltage/frequency pairs that are used to vary the voltage and frequency of a processor (CPU) 201. These voltage/frequency pairs are determined by an operational set point indicator 212 coupled to processor logic. For example, operational set point indicator 212 can be included on the silicon of CPU 201, on the package of CPU 201 or externally coupled to CPU 201 through a variety of well known techniques such as laser cutting, fusible devices, non-volatile storage and the like. CPU 201 receives a voltage 222 from a voltage regulator 223. Voltage regulator 223 is controlled by voltage control signals 224 (VID[4:0]) received from CPU 201 or, alternatively, from another source (not shown). By varying voltage control signals 224, voltage 222 can be varied. As such, voltage 222 can be varied dynamically during system operation to achieve multiple processor performance states. CPU 201 multiplies a received bus clock 239 by a multiplier value (not shown) to generate the core clocks for CPU 201. The multiplier value is stored, for example, in an internal register on CPU 201. As such, the multiplier value can be varied dynamically during system operation to vary the frequency of core clocks and achieve multiple processor performance states. By varying the voltage and frequency of CPU 201 according to voltage/frequency pairs identified by operational set point indicator 212, computer system 200 can achieve optimal performance and power savings.

Figure 3:
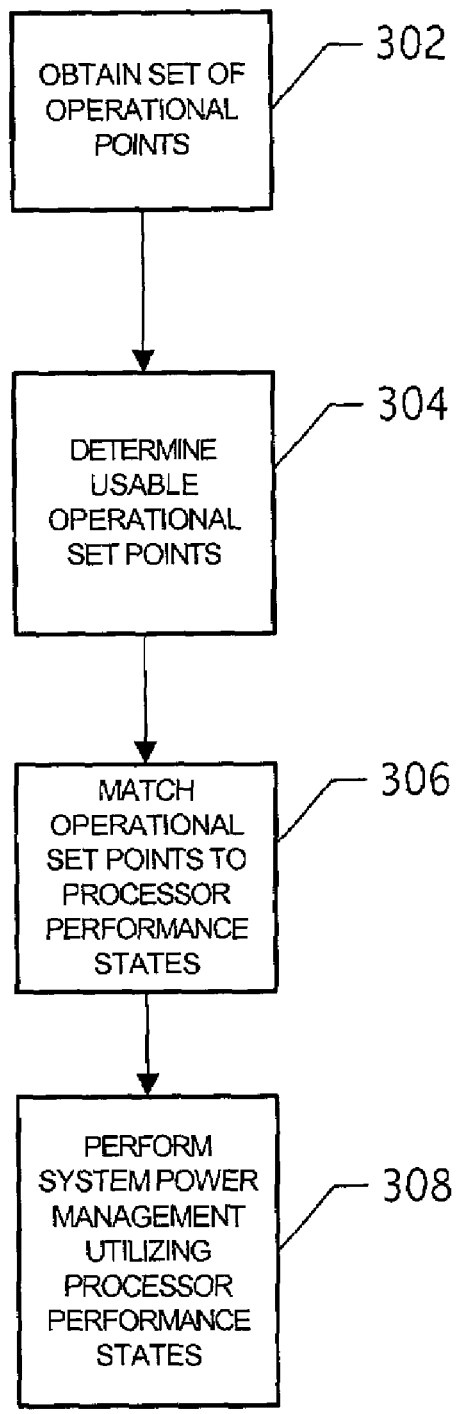
FIG. 3 illustrates a process implementing processor performance states utilizing an operational set point indicator according to an embodiment of the present invention.

FIG. 3 illustrates a process implementing processor performance states utilizing an operational set point indicator according to an embodiment of the present invention. Software, for example BIOS code or a power management driver, obtains a set of operational points utilizing an operational set point indicator coupled to an implemented processor, step 302. Further description of this step can be found in the alternate embodiments described in FIG. 4A through FIG. 7B. Software then determines usable operational set points, i.e., voltage/frequency pairs, to be used in managing the power usage of the system, step 304. For example, depending on system capabilities, only a subset of determined multiple voltage/frequency pairs may be usable and therefore implemented. Software matches the determined voltage/frequency pairs to processor performance states, step 306. System power management is performed utilizing the processor performance states to achieve optimal performance and power savings, step 308.

Figure 4A:
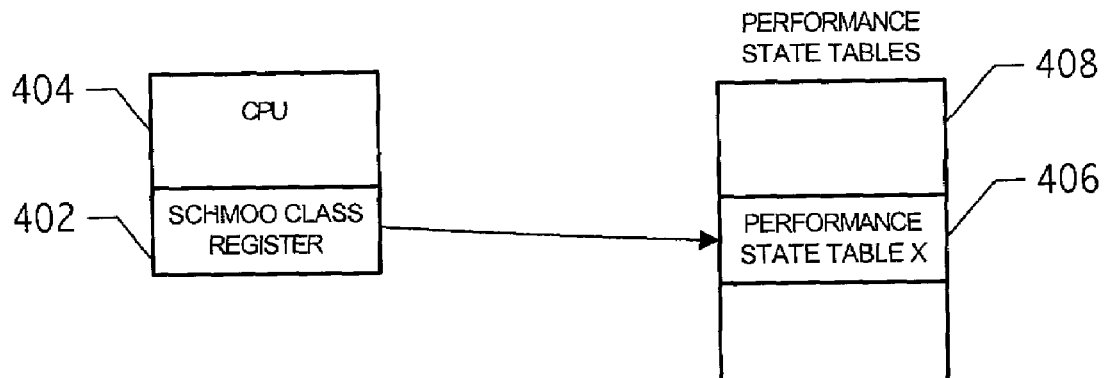
FIGS. 4A–4B illustrates the use of a Schmoo Class Register as an operational set point indicator according to an embodiment of the present invention.

FIG. 4A illustrates the use of a Schmoo Class Register as an exemplary operational set point indicator according to an embodiment of the present invention. Here, an operational set point indicator is a Schmoo Class Register 402 coupled to processor logic. For example, Schmoo Class Register 402 can be included on the silicon of a processor (CPU) 404, on the package of CPU 404 or externally coupled to CPU 404 through a variety of well known techniques such as laser cutting, fusible devices, non-volatile storage and the like. Schmoo Class Register 402 identifies a particular PST 406 (PST X) in a set of PSTs 408. Schmoo Class Register 402 contains a value that is understood by software drivers and/or the BIOS. PSTs 408 can be located, for example, in BIOS, system memory, or a software driver. Schmoo Class Register 402 can be implemented, for example, in fuse or other non-volatile technology and can be configured at the time of the silicon speed grade is determined. The value stored in Schmoo Class Register 402 can directly indicate which PST of a set of PSTs is to be used by power management software.

Figure 4B:
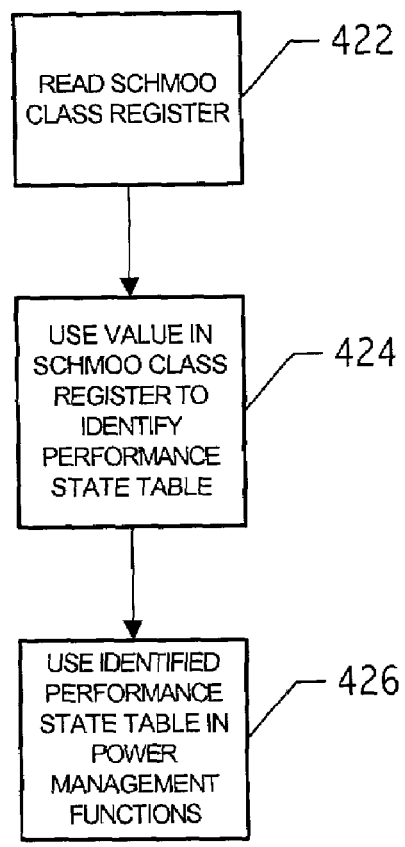

FIG. 4B illustrates a process of using a Schmoo Class Register as an exemplary operational set point indicator according to an embodiment of the present invention. Software reads a value from a Schmoo Class Register, step 422. The value in the Schmoo Class register is used to identify a particular performance state table, step 424. For example, the value in the register can be a pointer to or other indicator of a particular PST in a set of PSTs. Software then uses the identified PST in power management functions, step 426.

Figure 5A:
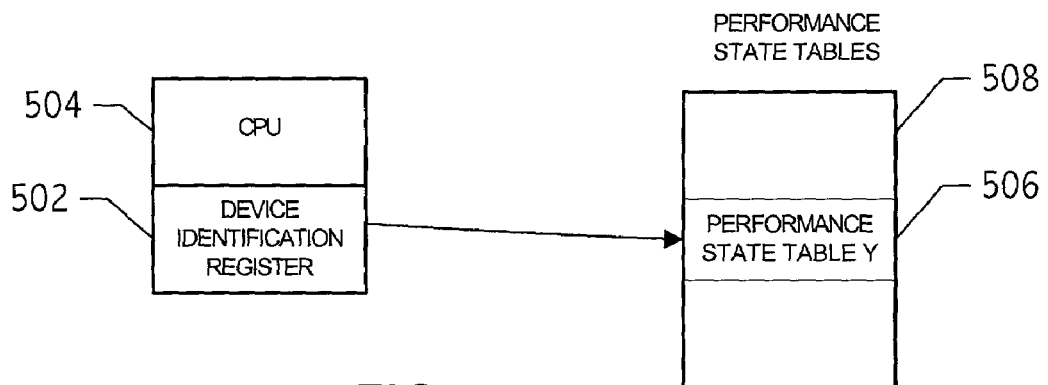
FIGS. 5A–5B illustrates the use of a Device Identification Register as an operational set point indicator according to another embodiment of the present invention.

FIG. 5A illustrates the use of a Device Identification Register as an exemplary operational set point indicator according to an embodiment of the present invention. Here, an operational set point indicator is a Device Identification Register 502 coupled to processor logic. For example, Device Identification Register 502 can be included on the silicon of a processor (CPU) 504, on the package of CPU 504 or externally coupled to CPU 504 through a variety of well known techniques such as laser cutting, fusible devices, non-volatile storage and the like. Device Identification Register 502 accurately identifies the implemented processor which can be used to identify a particular PST 506 (PST Y) in a set of PSTs 508. For example, Device Identification Register 502 identifies the significant bits from the CPUID instruction, the process, silicon version, and speed grade of the processor, including all laser cut information and other device information from any new methods of setting options on the processor (pin straps, and the like). Rather than accessing a multitude of locations, software reads a single location and obtains a single value which can be compared to a large case statement to identify a particular PST.

According to an embodiment of the invention, new feature bits are added to the most significant digits of the Device Identification Register so that software can easily determine if new features have been added to the processor since the BIOS was last updated.

PSTs 508 can be located, for example, in BIOS, system memory, or a software driver. Device Identification Register 502 can be implemented, for example, in fuse or other non-volatile technology and can be configured at the time of the silicon speed grade is determined. The value stored in Device Identification Register 502 is parsed by software and used to identify a particular PST in a set of PSTs to be used by power management software.

According to an embodiment of the invention, Device Identification Register 502 can contain a compressed or "packed" value to accurately identify the processor in as few bits as possible. Upon reading the packed value from Device Identification Register 502, software can uncompress or unpack the value and identify a particular PST 506 (PST Y) in a set of PSTs 508.

Device Identification Register 502, although herein described as providing an operational set point indicator for use in power management applications, has many other useful implementations as well. By providing an accurate technique for identifying the capabilities of CPU 504, Device Identification Register 502 can be used by the system for many other operations other than power management. For example, any application software or system configuration software that needs to identify the capabilities of CPU 504 can access Device Identification Register 502.

Figure 5B:
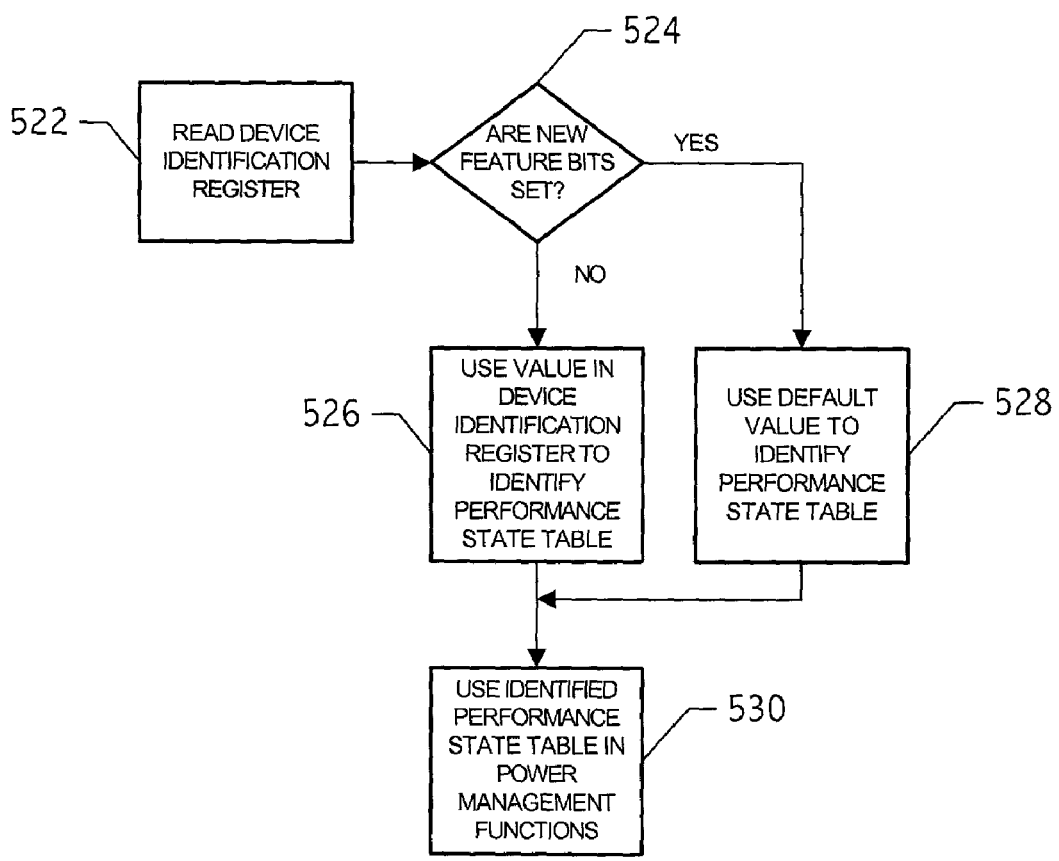

FIG. 5B illustrates a process of using a Device Identification Register as an exemplary operational set point indicator according to an embodiment of the present invention. Software reads a value from a Device Identification Register, step 522. The value is checked to determine if any new feature bits are set, step 524. If not, the value in the Device Identification Register is used to identify a particular PST from a set of PSTs, step 526. If any new feature bits are set, a default value is used to identify a performance state table in a set of PSTs, step 528. Software then uses the identified PST in power management functions, step 530.

Figure 6A:
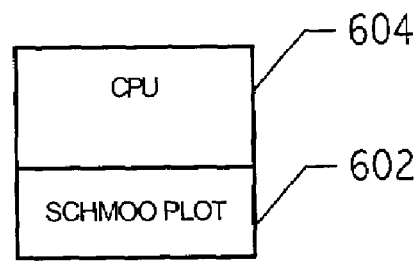
FIGS. 6A–6B illustrates the use of a Schmoo Plot as an operational set point indicator according to another embodiment of the present invention.

FIG. 6A illustrates the use of a Schmoo Plot as an exemplary operational set point indicator according to an embodiment of the present invention. Here, an operational set point indicator is a Schmoo Plot 602 coupled to processor logic. For example, Schmoo Plot 602 can be included on the silicon of a processor (CPU) 604, on the package of CPU 604 or externally coupled to CPU 604 through a variety of well known techniques such as laser cutting, fusible devices, non-volatile storage and the like. Schmoo Plot 602 is a matrix of valid operating voltage/frequency pairs for which CPU 604 can operate. Utilizing this information and system capabilities, software identifies usable operational set points to be used by power management software. For example, a voltage regulator is typically limited to a finite set of output voltages and the processor's clock multiple is also limited to a finite set of output frequencies. By combining system voltage and frequency capabilities with the valid operating voltage/frequency pairs derived from Schmoo Plot 602, the software can generate a valid set of operational set points to be used by power management software.

According to an embodiment of the invention, Schmoo Plot 602 can include the entire Schmoo plot for the device. For desktop systems, more information than actually needed is often included because the voltage generator for desktop systems, such as voltage generator 223, has a fixed set of available voltages. In addition, typical multipliers provide coarse granularities such as 3×, 3.5×, 4×, 4.5×, 5×, and the like. Therefore, storing a Schmoo point whose voltage axis does not fall very close to a valid voltage set point is not useful. Also, storing a Schmoo point whose frequency axis does not fall very close to a valid frequency set point (i.e., a valid multiplier value times the frequency of bus clock 239) is not useful. However, for embedded applications, providing the entire Schmoo Plot 602 adds flexibility. An embedded application can use a more capable voltage generation implementation, and therefore a much wider range of voltage set points can be used. In addition, an embedded application can utilize a wider variety of frequencies than a typical desktop system. For example, bus clock 239 can be under clocked (run at a slower than rated speed). Providing an entire Schmoo plot for the device provides for a device to be implemented in a much wider variety of systems, without requiring changes to BIOS or software drivers.

According to an embodiment of the invention, Schmoo Plot 602 can include a simplified Schmoo plot for the device. For example, certain set points can be left out of the plot based on standard characteristics of system designs. Schmoo points that contain either voltage or frequency components that are not possible in typical desktop systems are not included.

According to an embodiment of the invention, Schmoo Plot 602 can include multiple data sets based on temperature. Because heat affects performance, including only one set of data, whether the set includes the entire Schmoo Plot or just selected set points, requires the included data set to be for the worst case temperature. The inclusion of different Schmoo plots for a set of discrete temperature ranges would allow software to select the optimal Schmoo plot data set to use, and perhaps even switch between data sets in real time.

For example, Schmoo Plot 602 can include a data set for 0° C. nominal box temperature, and additional data sets up to 50° C. in 5° C. or 10° C. steps. Alternatively, the Schmoo Plot 602 can include three data sets of operational temperature ranges such as commercial, industrial and military. This is particularly useful for embedded applications where the working environment is not limited to office building conditions where extreme temperatures are uncommon.

According to an embodiment of the invention, Schmoo Plot 602 can contain the exact operational data for the attached device. Alternatively (and more commonly), Schmoo Plot 602 can contain operational data obtained by deriving a Schmoo Plot for a sample of devices of the same class, for example of the same processor revision and speed grade.

Figure 6B:
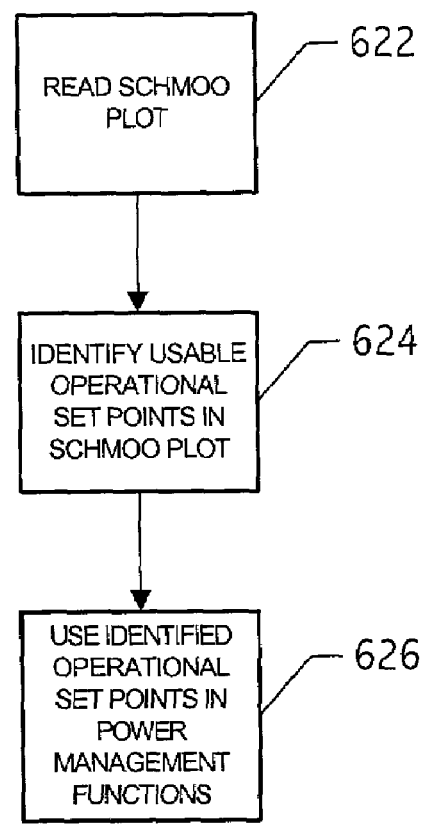

FIG. 6B illustrates a process of using a Schmoo Plot as an exemplary operational set point indicator according to an embodiment of the present invention. Software reads the Schmoo plot coupled to the implemented processor logic, step 622. Software identifies usable operational set points in the Schmoo Plot, step 624. Software then uses the identified operational set points in power management functions, step 626.

Figure 7A:
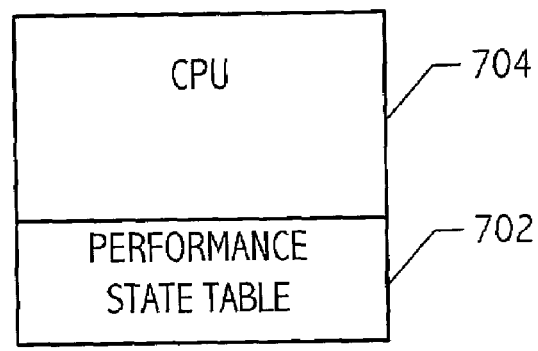
FIGS. 7A–7B illustrates the use of a PST as an operational set point indicator according to another embodiment of the present invention.

FIG. 7A illustrates the use of a PST as an exemplary operational set point indicator according to an embodiment of the present invention. Here, an operational set point indicator is a PST 702 coupled to processor logic. For example, PST 702 can be included on the silicon of a processor (CPU) 704, on the package of CPU 704 or externally coupled to CPU 704 through a variety of well known techniques such as laser cutting, fusible devices, non-volatile storage and the like. PST 702 can be directly used by power management software.

Figure 7B:
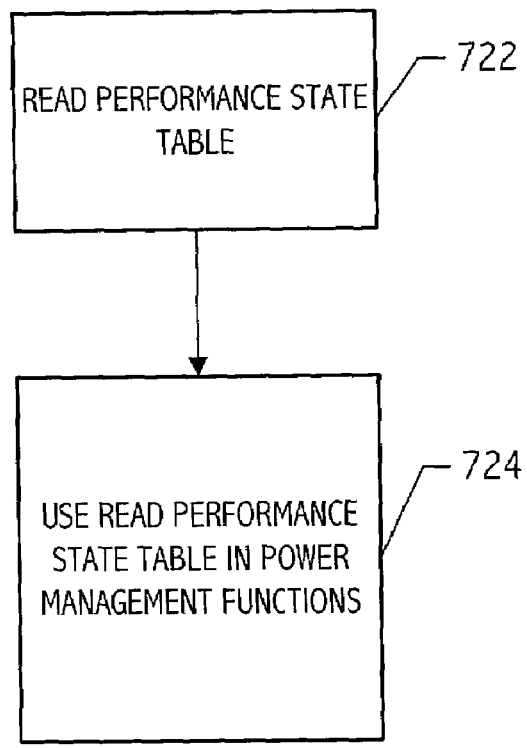

FIG. 7B illustrates a process of using a PST as an exemplary operational set point indicator according to an embodiment of the present invention. Software reads a PST, step 722. Software then uses the read PST in power management functions, step 724.

As illustrated in the alternate embodiments shown in FIGS. 6A–6B and 7A–7B, the operational set point indicator can be actual operating condition information of the device rather than, for example, a pointer to a PST stored in software. For example, the operational set point indicator can be a Schmoo plot or a PST coupled to a processor. Each individual processor or each class of processors (having the same process technology and speed grade) can have unique operating condition information. Because the operating condition information is included with the processor, new software revisions are not needed for each new version of the device.

The operational set point indicators as described herein are coupled to a device and can be implemented in, for example, fusible technology or non-volatile memory. Additionally, the operational set point indicator can be included into product silicon, its packages or module. In a preferred embodiment, the operational set point indicator is implemented in fuse technology and is configured at the time the silicon speed grade is determined. The fuses can be electrically programmed or laser programmed to identify the appropriate silicon speed grade.

The operational set point indicator has been described herein as coupled to a processor in a computer system, however, any device can utilize the operational set point indicator as described herein to obtain the benefits of the present invention.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An apparatus comprising:
    processor logic; and
    an operational set point indicator coupled to the processor logic, wherein the operational set point indicator identifies a plurality of operational set points for the processor logic, and wherein the apparatus is responsive to at least one of the operational set points identified by the operational set point indicator to provide power management of the processor logic, and wherein the operational set point indicator is stored in non-volatile storage.

2. The apparatus, as recited in claim 1, wherein each of the plurality of operational set points is a pair of an operational voltage and an operational frequency for application in conjunction to the processor logic.

3. The apparatus, as recited in claim 1, wherein the operational set point indicator is a Schmoo Class Register that identifies a particular performance state table (PST) located in memory.

4. The apparatus, as recited in claim 1, wherein the operational set point indicator is a Device Identification Register that identifies a plurality of capabilities of a device to identify a particular performance state table (PST) located in memory, wherein the device is a subset of the processor logic.

5. The apparatus, as recited in claim 4, wherein the Device Identification Register includes new feature identifier bits.

6. The apparatus, as recited in claim 1, wherein the operational set point indicator is operating condition information of a device, wherein the device is a subset of the processor logic.

7. The apparatus, as recited in claim 6, wherein the operating condition information is derived from a Schmoo Plot.

8. The apparatus, as recited in claim 6, wherein the operating condition information is a plurality of voltage/frequency pairs.

9. The apparatus, as recited in claim 6, wherein the operating condition information is derived from a consolidation of actual operation conditions of a plurality of devices.

10. The apparatus, as recited in claim 6, wherein the operating condition information is derived from only operating conditions of the device.

11. The apparatus, as recited in claim 6, wherein the operating condition information includes one or more of a set of commercial temperature operational set points, a set of industrial temperature operational set points, and a set of military temperature operational set points.

12. The apparatus, as recited in claim 1, wherein the operational set point indicator is added to a device after a speed grade determination, wherein the device is a subset of the processor logic.

13. The apparatus, as recited in claim 12, wherein the non-volatile storage is implemented utilizing fuse technology.

14. A method comprising:
    obtaining information from an operational set point indicator;

utilizing the information to identify a plurality of operational set points for processor logic; and utilizing at least one of the operational set points in providing power management of the processor logic, wherein the operational set point indicator is stored in non-volatile storage.

15. The method, as recited in claim 14, wherein each of the plurality of operational set points is a pair of an operational voltage and an operational frequency.

16. The method, as recited in claim 14, further comprising:

identifying each of the plurality of operational set points to one of a plurality of processor performance states.

17. The method, as recited in claim 16, further comprising:

performing system power management utilizing the plurality of processor performance states.

18. The method, as recited in claim 14, wherein the utilizing the information comprises:

determining the plurality of operational set points utilizing system capability information.

19. The method, as recited in claim 14, wherein the operational set point indicator is a Schmoo Class Register that identifies a particular performance state table (PST) located in memory.

20. The method, as recited in claim 14, wherein the operational set point indicator is a Device Identification Register that identifies a plurality of capabilities of a device to identify a particular performance state table (PST) located in memory.

21. The method, as recited in claim 14, wherein the operational set point indicator is operating condition information of a device.

22. The method, as recited in claim 21, wherein the operating condition information is derived from a Schmoo Plot.

23. The method, as recited in claim 21, wherein the operating condition information is a plurality of voltage/frequency pairs.

24. The method, as recited in claim 21, wherein the operating condition information is derived from a consolidation of actual operation conditions of a plurality of devices.

25. The method, as recited in claim 21, wherein the operating condition information is derived from only operating conditions of the device.

26. The method, as recited in claim 21, wherein the operating condition information includes one or more of a set of commercial temperature operational set points, a set of industrial temperature operational set points, and a set of military temperature operational set points.

27. The method, as recited in claim 14, wherein the non-volatile storage is implemented utilizing fuse technology.

28. A computer system comprising:

processor logic;

a voltage regulator coupled to the processor logic to supply a voltage to the processor logic; and an operational set point indicator coupled to the processor logic for providing a single source of information identifying a plurality of operational set points, wherein the computer system is responsive to at least one of the operational set points identified by the operational set point indicator to provide power management of the computer system, and wherein the operational set point indicator is stored in non-volatile storage.

29. The computer system, as recited in claim 28, wherein each of the plurality of operational set points is a pair of an operational voltage and an operational frequency for application in conjunction to the processor logic.

30. The computer system, as recited in claim 28, wherein the operational set point indicator is a Schmoo Class Register that identifies a particular performance state table (PST) located in memory.

31. The computer system, as recited in claim 28, wherein the operational set point indicator is a Device Identification Register that identifies a plurality of capabilities of a device to identify a particular performance state table (PST) located in memory, wherein the device is a subset of the processor logic.

32. The computer system, as recited in claim 31, wherein the Device Identification Register includes new feature identifier bits.

33. The computer system, as recited in claim 28, wherein the operational set point indicator is operating condition information of a device, wherein the device is a subset of the processor logic.

34. The computer system, as recited in claim 33, wherein the operating condition information is derived from a Schmoo Plot.

35. The computer system, as recited in claim 33, wherein the operating condition information is a plurality of voltage/frequency pairs.

36. The computer system, as recited in claim 33, wherein the operating condition information is derived from a consolidation of actual operation conditions of a plurality of devices.

37. The computer system, as recited in claim 33, wherein the operating condition information is derived from only operating conditions of the device.

38. The computer system, as recited in claim 33, wherein the operating condition information includes one or more of a set of commercial temperature operational set points, a set of industrial temperature operational set points, and a set of military temperature operational set points.

39. The computer system, as recited in claim 28, wherein the operational set point indicator is added to a device after a speed grade determination, wherein the device is a subset of the processor logic.

40. The computer system, as recited in claim 39, wherein the non-volatile storage is implemented utilizing fuse technology.

41. A method comprising:

providing a single source of information stored in non-volatile storage identifying a plurality of operational set points on an integrated circuit device; and using at least one of the plurality of operational set points identified by the single source of information for controlling power management of a system that utilizes the device.

42. The method, as recited in claim 41, wherein each of the plurality of operational set points is a pair of an operational voltage and an operational frequency for application in conjunction to the integrated circuit device.

43. The method, as recited in claim 41, wherein the plurality of operational set points are derived from a Schmoo plot.

44. The method, as recited in claim 41, wherein the plurality of operational set points are derived from a subset of a Schmoo Plot.

45. The method, as recited in claim 41, wherein the plurality of operational set points includes one or more of a set of commercial temperature operational set points, a set of industrial temperature operational set points, and a set of military temperature operational set points.

46. The method, as recited in claim 41, wherein the plurality of operational set points is added to the integrated circuit device after a speed grade determination.

47. The method, as recited in claim 41, wherein the non-volatile storage is implemented utilizing fuse technology.

* * * * *

UNITED STATES PATENT AND TRADEMARK OFFICE
CERTIFICATE OF CORRECTION

| | | |
|---|---|---|
| PATENT NO. | : 7,188,261 B1 | Page 1 of 1 |
| APPLICATION NO. | : 10/132614 | |
| DATED | : March 6, 2007 | |
| INVENTOR(S) | : David F. Tobias and Morrie Altmejd | |

It is certified that error appears in the above-identified patent and that said Letters Patent is hereby corrected as shown below:

Title page
Page 1, Paragraph Item (63), please replace "Continuation" with --Continuation in part--

Col. 1, line 8, please replace "continuation" with --continuation in part--

Signed and Sealed this

First Day of May, 2007

JON W. DUDAS
*Director of the United States Patent and Trademark Office*